(12) United States Patent
Kim et al.

(10) Patent No.: US 10,274,665 B2
(45) Date of Patent: Apr. 30, 2019

(54) BACK LIGHT UNIT FOR HOLOGRAPHIC DISPLAY

(71) Applicant: SAMSUNG ELECTRONICS CO., LTD., Suwon-si (KR)

(72) Inventors: Sunil Kim, Seoul (KR); Juwon Seo, Osan-si (KR); Wontaek Seo, Yongin-si (KR); Chilsung Choi, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/251,475

(22) Filed: Aug. 30, 2016

(65) Prior Publication Data

US 2017/0090089 A1 Mar. 30, 2017

(30) Foreign Application Priority Data

Sep. 24, 2015 (KR) .................. 10-2015-0135767

(51) Int. Cl.
*F21V 8/00* (2006.01)
(52) U.S. Cl.
CPC ........... *G02B 6/005* (2013.01); *G02B 6/0055* (2013.01)
(58) Field of Classification Search
CPC .............................. G02B 6/005; G02B 6/0055
USPC .................................................. 362/607, 19
See application file for complete search history.

(56) References Cited

U.S. PATENT DOCUMENTS

| | | | |
|---|---|---|---|
| 5,339,179 A * | 8/1994 | Rudisill ..................... | F21V 7/00 349/65 |
| 5,854,697 A | 12/1998 | Caulfield et al. | |
| 6,002,829 A * | 12/1999 | Winston ..................... | F21V 5/02 385/129 |
| 6,014,192 A | 1/2000 | Lehureau et al. | |
| 7,614,757 B2 | 11/2009 | Nesterenko et al. | |
| 7,672,051 B2 | 3/2010 | Hoshino et al. | |
| 8,619,363 B1 * | 12/2013 | Coleman .................. | G02B 5/18 359/576 |
| 2004/0109663 A1 * | 6/2004 | Olczak ................ | G02B 6/0031 385/146 |

(Continued)

FOREIGN PATENT DOCUMENTS

| | | |
|---|---|---|
| JP | 10-64319 A | 3/1998 |
| JP | 2013-175386 A | 9/2013 |

(Continued)

OTHER PUBLICATIONS

Wikipedia: Backscatter: https://en.wikipedia.org/wiki/Backscatter Oct. 19, 2018.*

*Primary Examiner* — Anh T Mai
*Assistant Examiner* — Glenn Zimmerman
(74) *Attorney, Agent, or Firm* — Sughrue Mion, PLLC

(57) ABSTRACT

Provided is a back light unit (BLU) for holographic display. The BLU includes a first diffraction grating attached to a waveguide, a second diffraction grating that supplies light to the first diffraction grating, a light source that supplies light to the second diffraction grating, and a light reflection element that reflects light towards the first diffraction grating. The back light unit may further include a lens that is disposed in front of the waveguide. The light reflection element may be disposed parallel to a rear surface of the waveguide. The light reflection element may be inclined with respect to the rear surface of the waveguide. The light reflection element may be a mirror or a prism array.

11 Claims, 3 Drawing Sheets

(56) References Cited

U.S. PATENT DOCUMENTS

| | | | | |
|---|---|---|---|---|
| 2004/0212757 | A1* | 10/2004 | Lee | G02B 6/0038 349/64 |
| 2005/0086163 | A1* | 4/2005 | Johnson | G06Q 20/102 705/40 |
| 2007/0285793 | A1* | 12/2007 | Liu | G02B 17/06 359/630 |
| 2009/0051989 | A1* | 2/2009 | Dobschal | F41G 1/30 359/15 |
| 2009/0303409 | A1* | 12/2009 | Park | G02F 1/133308 349/58 |
| 2010/0049283 | A1* | 2/2010 | Johnson | A61N 5/0616 607/89 |
| 2011/0261280 | A1* | 10/2011 | Yu | G02F 1/1336 349/58 |
| 2013/0039029 | A1* | 2/2013 | Wang | G02B 6/0035 362/19 |
| 2014/0160543 | A1* | 6/2014 | Putilin | G03H 1/2202 359/9 |
| 2015/0086163 | A1* | 3/2015 | Valera | G02B 6/0035 385/37 |
| 2016/0065955 | A1 | 3/2016 | Kim et al. | |
| 2016/0091648 | A1* | 3/2016 | Bang | G02B 6/005 362/607 |
| 2016/0147003 | A1* | 5/2016 | Morozov | G02B 6/0023 359/11 |
| 2018/0172893 | A1* | 6/2018 | Fattal | G02B 6/0016 |

FOREIGN PATENT DOCUMENTS

| | | |
|---|---|---|
| KR | 10-2006-0013548 A | 2/2006 |
| KR | 10-2007-0027980 A | 3/2007 |
| KR | 10-2016-0026570 A | 3/2016 |
| WO | WO 2013144565 A1 * 10/2013 | ........... G02B 6/0035 |

* cited by examiner

BACK LIGHT UNIT FOR HOLOGRAPHIC DISPLAY

CROSS-REFERENCE TO RELATED APPLICATION

This application claims priority from Korean Patent Application No. 10-2015-0135767, filed on Sep. 24, 2015 in the Korean Intellectual Property Office, the disclosure of which is incorporated herein by reference in its entirety.

BACKGROUND

1. Field

Exemplary embodiments relate to light sources for display, and more particularly, to back light units for holographic display.

2. Description of the Related Art

A back light unit (BLU) for a holographic display uses highly coherent light when compared to a BLU for a liquid crystal display (LCD). The BLU for a holographic display is of a waveguide type. A diffraction grating is used to maintain coherency of light emitted from the waveguide. The diffraction grating may be manufactured as a surface corrugate type or a reflective index modulation type. A diffraction grating of a surface corrugate type or a reflective rate modulation type may be formed through a developing process and an etching process after exposing a coherent pattern that is formed by irradiating two laser rays on a photosensitive medium, such as a photoresist or a photopolymer. In terms of mass production, the surface corrugate type diffraction grating is widely used.

In a holographic display, a viewing zone for viewing a hologram may be determined according to a resolution of a spatial light modulator (SLM). When a currently commercialized LCD is applied to a holographic display, a hologram image may be viewed in a narrow region of, for example, a diameter of approximately 8 mm from a distance of approximately 1 m. Due to the region limitation, at least two viewing zones must be formed at locations that correspond to the eyes of a viewer, and the viewer may view the hologram image in a state of fixing the locations where the viewing zones are formed. In the case of a conventional BLU for providing a hologram image by using a holographic display of the related art, the structure is relatively complicated, and also, a relatively large number of parts is used to form the hologram image.

SUMMARY

Provided are back light units (BLUs) (also referred to herein as "back light apparatuses") for holographic display which are designed to increase light utilization efficiency.

Provided are BLUs for holographic display having a simple configuration and providing a wider viewing zone.

Additional aspects will be set forth in part in the description which follows and, in part, will be apparent from the description, or may be learned by practice of the presented exemplary embodiments.

According to an aspect of an exemplary embodiment, a back light unit for holographic display is provided. The back light unit comprises: a waveguide, a first diffraction grating attached to the waveguide, a second diffraction grating that redirects light toward the first diffraction grating, a light source that supplies light to the second diffraction grating, and a light reflection element that reflects light that is emitted from a rear side of the waveguide toward the first diffraction grating.

The back light unit may further comprise a lens that is disposed in front of the waveguide.

The light reflection element may be disposed parallel to a rear surface of the waveguide.

The light reflection element may be disposed to be inclined with respect to the rear surface of the waveguide.

A rotation device that is configured for rotating the light reflection element may be connected to the light reflection element.

The light reflection element may comprise a mirror or a prism array.

The light reflection element may be separated from the waveguide.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Figure 1:
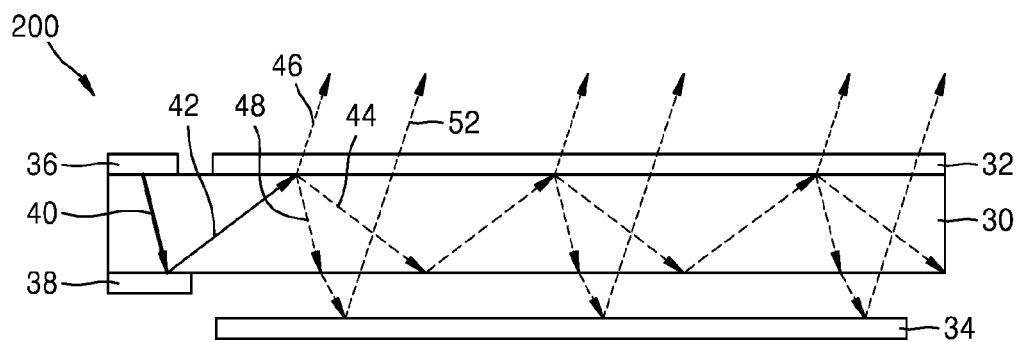
FIG. 1 is a plan view of a back light unit for a holographic display, according to an exemplary embodiment.

Hereinafter, a back light unit for a holographic display will now be described in detail with reference to the accompanying drawings. In the drawings, thicknesses of layers and regions may be exaggerated for clarity of layers and regions.

FIG. 1 is a plan view of a back light unit (BLU) (also referred to herein as a "back light apparatus") 200 for a holographic display, according to an exemplary embodiment.

Referring to FIG. 1, the BLU 200 for a holographic display includes a waveguide 30, a first diffraction grating 32, a light reflection element 34, a light source 36, and a second diffraction grating 38. The first diffraction grating 32 is attached to a front side (a front surface) of the waveguide 30. The first diffraction grating 32 covers the majority of the front surface of the waveguide 30. The first diffraction grating 32 is an output diffraction grating that generates a diffraction light, and generates a first frontward diffraction light 46 with respect to light emitted towards the front side of the waveguide 30, that is, towards a viewer. The first frontward diffraction light 46 may be coherent light. The first diffraction grating 32 generates a reflection light or a backward diffraction light 48 together with the first frontward diffraction light 46 with respect to an incident light 42. The backward diffraction light 48 moves towards a rear surface of the waveguide 30, passes through the waveguide 30 and is emitted toward the rear of the waveguide 30. The light reflection element 34 is disposed in proximity to the rear of the waveguide 30. The light reflection element 34 is separated from the waveguide 30 by a gap. The light reflection element 34 reflects the backward diffraction light 48 that is emitted from the rear of the waveguide 30 towards the waveguide 30. Backward diffraction light 52 reflected by the light reflection element 34 is emitted toward a front side of the waveguide 30 by sequentially passing through the waveguide 30 and the first diffraction grating 32. Hereinafter, the backward diffraction light 52 that is reflected by the light reflection element 34 and is emitted toward the front side of the waveguide 30 in this manner is referred to as a second frontward diffraction light 52. Since the first frontward diffraction light 46 and the second frontward diffraction light 52 that are originated from a single light source 36 are used for displaying a hologram image, light utilization efficiency may be increased. Also, since two viewing zones may be formed on a front side of the holographic display by using the first frontward diffraction light 46 and the second frontward diffraction light 52, it is unnecessary to include two light sources, and thus, the structure and the composition of the BLU may be simplified.

Next, the light reflection element 34 may be disposed parallel to a rear surface of the waveguide 30. The light reflection element 34 may be, for example, a mirror, but is not limited thereto. The light source 36 may be attached to a front surface of the waveguide 30. The light source 36 may supply light to the second diffraction grating 38 via the waveguide 30. Light 40 incident to the second diffraction grating 38 from the light source 36 enters the second diffraction grating 38 at a predetermined incidence angle. The incidence angle may be set in advance in consideration of the emission directions of the first frontward diffraction light 46 and the second frontward diffraction light 52. Although it will be described below, in the case when the light reflection element 34 rotates, an incidence angle of light 40 that enters the second diffraction grating 38 may be controlled to be within a predetermined range. The second diffraction grating 38 may be provided on a rear surface of the waveguide 30. The second diffraction grating 38 may face the light source 36, with the waveguide 30 being interposed therebetween. The second diffraction grating 38 may supply light to the first diffraction grating 32 via the waveguide 30. A diffraction light 42 with respect to the incident light 40 may be generated by the second diffraction grating 38. The diffraction light 42 propagates along the waveguide 30. A portion of the diffraction light 42 that reaches a contact surface (a boundary surface) between the waveguide 30 and the first diffraction grating 32 makes a total reflection, and the remaining of the diffraction light 42 is diffracted by the first diffraction grating 32 to generate the first frontward diffraction light 46 and the backward diffraction light 48. Light 44 that makes a total reflection at the contact surface (the boundary surface) between the waveguide 30 and the first diffraction grating 32 again makes a total reflection at the rear surface of the waveguide 30 and propagates towards the front surface of the waveguide 30, and the total reflection and the diffraction described above are repeated. The light source 36 may be disposed apart from the waveguide 30. In this case, the emission angle of light emitted from the light source 36 may be controlled so that the incidence angle of the light 40 that enters the second diffraction grating 38 is equal to the case when the light source 36 is attached to the front surface of the waveguide 30.

Figure 2:
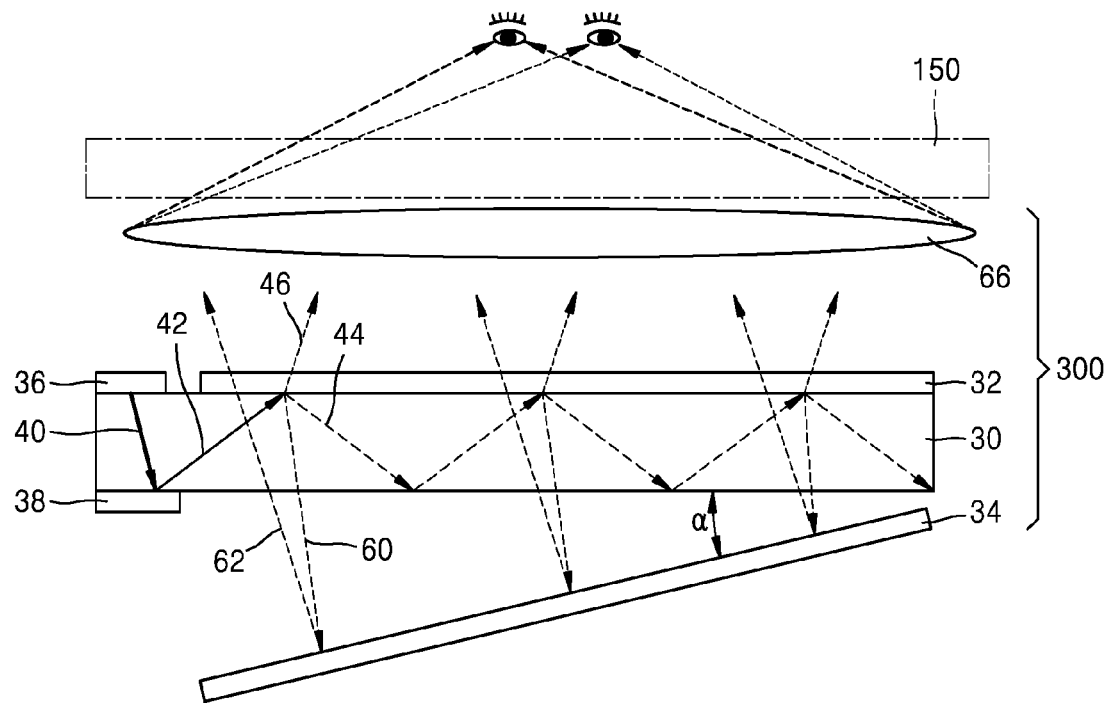
FIG. 2 is a plan view of a back light unit for a holographic display, according to another exemplary embodiment.

FIG. 2 is a plan view of a back light unit (BLU) (also referred to herein as a "back light apparatus") 300 for a holographic display, according to another exemplary embodiment. Parts which are different from the corresponding parts of FIG. 1 will be described. Like reference numerals are used for elements that are substantially identical to the elements of FIG. 1, and the descriptions thereof will not be repeated. The same rule will be applied to the following exemplary embodiments that will be described below.

Referring to FIG. 2, a lens 66 is disposed at a front side of the waveguide 30. The lens 66 is a focusing lens, such as, for example, a convex lens. The light reflection element 34 is not parallel to the waveguide 30. That is, the light reflection element 34 is disposed to be inclined at a predetermined angle α with respect to the rear surface of the waveguide 30. A backward diffraction light 60 that is diffracted backwards with respect to the waveguide 30 from the first diffraction grating 32 is reflected toward the waveguide 30 by the light reflection element 34. A light 62 reflected by the light reflection element 34 is emitted toward the front side of the waveguide 30 through the waveguide 30 and the first diffraction grating 32. The light 62 reflected by the light reflection element 34 is the same light as the backward diffraction light 60, and thus, the light 62 may be a third frontward diffraction light 62. The first frontward diffraction light 46 and the third frontward diffraction light 62 may be focused by the lens 66 and used for displaying a hologram image. The first frontward diffraction light 46 and the third frontward diffraction light 62 are not parallel to each other, and propagation directions are also different from each other. The propagation direction of the first frontward diffraction light 46 is a right side direction, but the propagation direction of the third frontward diffraction light 62 is a left side direction due to the effect of the inclined light reflection element 34. Accordingly, the focusing location of the first frontward diffraction light 46 and the focusing location of the third frontward diffraction light 62 by the lens 66 are different from each other, and thus, two viewing zones may be formed. In FIG. 2, reference numeral 150 indicates a display panel that includes a hologram.

Figure 3:
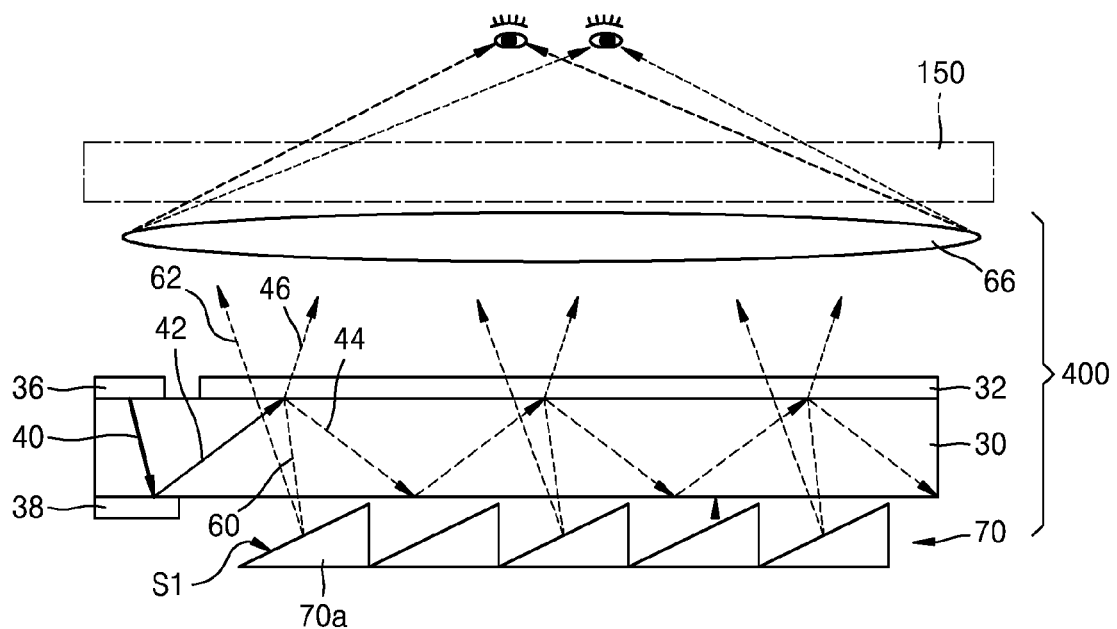
FIG. 3 is a plan view of a back light unit for a holographic display, according to another exemplary embodiment.

FIG. 3 is a plan view of a back light unit (BLU) (also referred to herein as a "back light apparatus") 400 for a holographic display, according to another exemplary embodiment.

Referring to FIG. 3, a prism array 70 is disposed at a rear side of the waveguide 30. Since the prism array 70 is disposed, the volume of the BLU 400 may be reduced by comparison with the volume of the BLU of FIG. 2. The whole prism array 70 may be disposed parallel to the waveguide 30. The prism array 70 is provided as one of a plurality of light reflection elements. The prism array 70 includes a plurality of prisms 70a that constitute an array. An inclined surface S1 of each of the prisms 70a may be a reflection surface. Accordingly, the prism array 70 may function in a same manner as the inclined light reflection element 34 of FIG. 2. The backward diffraction light 60 emitted towards the rear side of the waveguide 30 becomes the third frontward diffraction light 62 by being reflected at the inclined surfaces S1 of the prisms 70a of the prism array 70. The forming of two viewing zones by the first frontward diffraction light 46 and the third frontward diffraction light 62 is the same as the forming of the two viewing zones as described above with reference to FIG. 2.

However, if necessary, as the light reflection element 34 that is disposed at an angle of inclination in FIG. 2, the prism array 70 may be disposed at an angle of inclination with respect to the rear surface of the waveguide 30. In this case, a reflection angle of the backward diffraction light 60 that is reflected at the inclination surface S1 of the prism 70a is greater than the reflection angle when the prism array 70 is not rotated. Accordingly, the incidence angle of the light 40 that enters the second diffraction grating 38 may be appropriately controlled so that the propagation direction of the third frontward diffraction light 62 does not deviate from the lens 66. The control of the incidence angle may be achieved by controlling an emission angle of light emitted from the light source 36, that is, an incidence angle of light that enters the front surface of the waveguide 30 from the light source 36. In FIG. 3, reference numeral 150 indicates a display panel that includes a hologram.

Figure 4:
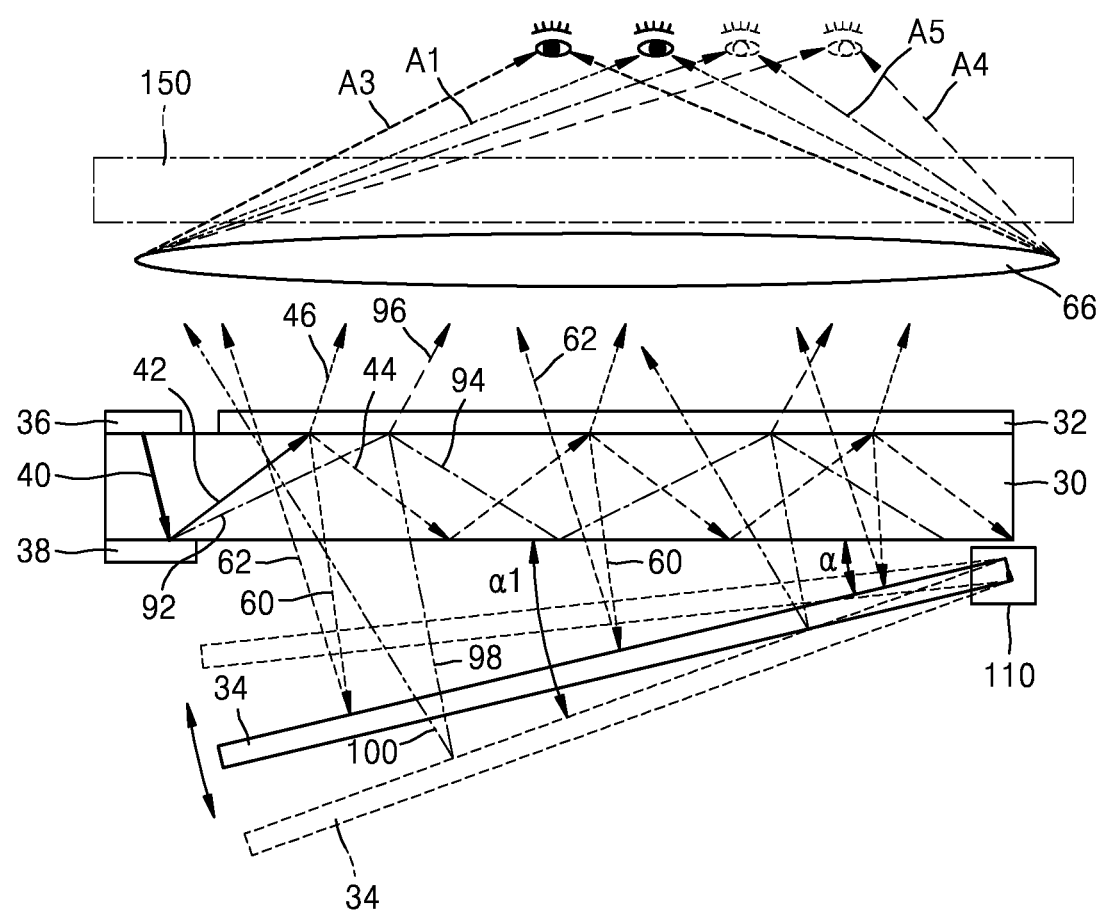
FIG. 4 is a plan view showing a case that a light reflection element is rotated within a predetermined range, according to an exemplary embodiment illustrated in FIG. 2.

FIG. 4 is a plan view showing a case in which the light reflection element 34 is rotated within a predetermined range, according to the exemplary embodiment illustrated in FIG. 2.

Referring to FIG. 4, the light reflection element 34 may be rotated within a predetermined angular range. For this purpose, a rotation device 110 may be provided at a side of the light reflection element 34. When the light reflection element 34 rotates, the propagation direction of light that is emitted towards the front side of the waveguide 30 may be changed, and as a result, the viewing zone is changed. For example, when the inclination angle α of the light reflection element 34 is increased to a first inclination angle α1 by the rotation of the light reflection element 34, a propagation angle (i.e., an angle that is measured with respect to a vertical line of the front surface of the waveguide 30) of a fifth frontward diffraction light 100 that is reflected by the light reflection element 34 is greater than the propagation angle of the third frontward diffraction light 62. The fifth frontward diffraction light 100 and the third frontward diffraction light 62 propagate in a left direction. However, since the propagation angles of the third and fifth frontward diffraction lights 62 and 100 are different, the propagation directions are correspondingly different from each other. Accordingly, locations of third and fifth viewing zones formed by the third and fifth frontward diffraction lights 62 and 100 are different from each other. When the inclination angle of the light reflection element 34 is increased to the first inclination angle α1, in order to control the propagation direction of the fifth frontward diffraction light 100 to not deviate from the lens 66, a light 92 having an incidence angle greater than that of the light 42 that enters when the light reflection element 34 is not rotated is incident to a contact surface (a boundary surface) between the waveguide 30 and the first diffraction grating 32. The light 92 is divided into a total reflection light 94, a fourth frontward diffraction light 96, and a backward diffraction light 98 at the contact surface. The light 92 is light diffracted by the second diffraction grating 38, and thus, an incidence angle of the light 92 with respect to the contact surface (the boundary surface) may be controlled by controlling the incidence angle of the light 40 that enters the second diffraction grating 38. Since the light 42 and the light 92 have different incidence angles with respect to the contact surface (the boundary surface), locations where the first frontward diffraction light 46 and the backward diffraction light 60 are generated from the light 42 and locations where the fourth frontward diffraction light 96 and the backward diffraction light 98 are generated from the light 92 on the contact surface (the boundary surface) are different. Since the incidence angles of the light 42 and the light 92 are different from each other, emission angles of the first frontward diffraction light 46 and the fourth frontward diffraction light 96 are different. That is, the propagation directions of both the first and fourth frontward diffraction lights 46 and 96 are rightward directions. However, the proceeding angles of the first and fourth frontward diffraction lights 46 and 96 are different from each other. The propagation angle (i.e., an angle that is measured with respect to a vertical line of the front surface of the waveguide 30) of the fourth frontward diffraction light 96 may be greater than the propagation angle of the first frontward diffraction light 46. Accordingly, a fourth viewing zone A4 formed by the fourth frontward diffraction light 96 is located on the right side of a first viewing zone A1 formed by the first frontward diffraction light 46. The backward diffraction light 98 becomes the fifth frontward diffraction light 100 by the light reflection element 34 that is located with the first inclination angle α1 with respect to the waveguide 30.

The first and third viewing zones A1 and A3 are two viewing zones formed by the first frontward diffraction light 46 and the third frontward diffraction light 62 when the light reflection element 34 is inclined with a given inclination angle of α, and the fourth and fifth viewing zones A4 and A5 are two viewing zones formed by the fourth frontward diffraction light 96 and the fifth frontward diffraction light 100 when the light reflection element 34 is rotated with respect to the waveguide 30 with the first inclination angle α1. The point that the locations of the first and third viewing zones A1 and A3 are different from the locations of the fourth and fifth viewing zones A4 and A5 corresponds to the fact that the viewing zones may be changed by rotating the light reflection element 34.

Furthermore, when an emission angle of light emitted from the light source 36 or an incidence angle of the light 40 that enters the second diffraction grating 38 is controlled in real time and this is coupled to the rotation device 110 of the light reflection element 34, the locations where viewing zones are formed may be changed in real time. Accordingly, when the BLU according to the exemplary embodiment is used, viewing zones where a hologram may be viewed by both eyes of a viewer may be formed in real time by tracing the eyes of the viewer.

In FIG. 4, reference numeral 150 indicates a display panel that includes a hologram.

In the exemplary embodiments described above, the locations of the light source 36 and the second diffraction grating 38 may be exchanged with each other. That is, the light source 36 may be disposed on a rear surface of the waveguide 30.

The BLU described above includes a single light source. Therefore, the configuration of the BLU is relatively simple when compared to a BLU of the related art. The BLU includes a light reflection element which is disposed at the rear side of a waveguide. The light reflection element reflects diffraction light emitted from the rear side of the waveguide toward the front side of the waveguide. Accordingly, both the light emitted towards the front side of the waveguide and the light reflected towards the front side of the waveguide by the light reflection element enter the hologram, and thus, light utilization efficiency may be increased. When the incidence angle of the light that enters the waveguide from the light source is controlled, a refraction angle of light that incidents to the waveguide may be controlled. Accordingly, a total reflection angle of light in the waveguide and emission angles of light that is diffracted toward the front side of the waveguide and light that is diffracted toward the back side of the waveguide may also be controlled. As a result, the incidence angle of the backward diffraction light that reaches to the light reflection element may be changed by controlling the incidence angle of light that enters the waveguide. That is, the location of viewing zones for viewing a hologram may be changed in real time by rotating the light reflection element within a predetermined angular range in correspondence with the above-described situation of angular variation. Furthermore, through coupling the changes of incidence angle of light that enters the waveguide from a light source to the rotational operation of the light reflection element in real time, a hologram image may be provided by tracking viewing locations of a viewer. That is, an eye tracking operation with respect to a viewer is possible.

While one or more exemplary embodiments have been described with reference to the figures, it will be understood by those of ordinary skill in the art that various changes in form and details may be made therein without departing from the spirit and scope as defined by the following claims.

What is claimed is:

1. A back light apparatus for holographic display, the back light apparatus comprising:
   a waveguide;
   a first diffraction grating attached to the waveguide, the first diffraction grating generating a frontward diffraction light and a backward diffraction light;
   a second diffraction grating configured to redirect light toward the first diffraction grating via the waveguide;
   a light source configured to supply light to the second diffraction grating via the waveguide; and
   a mirror configured to fully reflect the backward diffraction light that is emitted from a rear surface of the waveguide toward the first diffraction grating.

2. The back light apparatus of claim 1, further comprising a lens that is disposed in front of the waveguide with respect to light that is incident upon the waveguide.

3. The back light apparatus of claim 1, wherein the mirror is disposed parallel to a rear surface of the waveguide.

4. The back light apparatus of claim 1, wherein the mirror is disposed to be inclined with respect to a rear surface of the waveguide.

5. The back light apparatus of claim 1, wherein a rotation device which is configured for rotating the mirror is connected to the mirror.

6. The back light apparatus of claim 1, wherein the mirror is separated from the waveguide.

7. The back light apparatus of claim 1, wherein the mirror comprises a prism array.

8. The back light apparatus of claim 1, wherein the second diffraction grating is formed only at a portion of the rear surface of the waveguide.

9. The back light apparatus of claim 1, wherein the second diffraction grating is formed only at a portion of the rear surface of the waveguide facing the mirror.

10. The back light apparatus of claim 1, wherein the second diffraction grating is disposed so that the backward diffraction light does not pass through the second diffraction grating.

11. The back light apparatus of claim 1, wherein the first diffraction grating and the mirror are configured to form two viewing zones on a front side of the holographic display by using the frontward diffraction light and the backward diffraction light.

* * * * *